(12) United States Patent
Wang et al.

(10) Patent No.: US 9,794,513 B2
(45) Date of Patent: Oct. 17, 2017

(54) VIDEO CONFERENCE METHOD, TERMINAL, AND SYSTEM

(71) Applicant: ZTE CORPORATION, Shenzhen, Guangdong Province (CN)

(72) Inventors: Yang Wang, Shenzhen (CN); Peng Ding, Shenzhen (CN); Tinggan Shi, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/107,465

(22) PCT Filed: Feb. 25, 2014

(86) PCT No.: PCT/CN2014/072525
§ 371 (c)(1),
(2) Date: Jun. 23, 2016

(87) PCT Pub. No.: WO2014/161404
PCT Pub. Date: Oct. 9, 2014

(65) Prior Publication Data
US 2016/0323544 A1 Nov. 3, 2016

(30) Foreign Application Priority Data
Dec. 27, 2013 (CN) .......................... 2013 1 0735197

(51) Int. Cl.
*H04N 7/15* (2006.01)
*H04N 7/14* (2006.01)
(Continued)

(52) U.S. Cl.
CPC ............. *H04N 7/147* (2013.01); *H04L 12/18* (2013.01); *H04L 65/403* (2013.01);
(Continued)

(58) Field of Classification Search
CPC .......... H04N 7/14; H04N 7/15; H04N 7/142; H04N 7/152
(Continued)

(56) References Cited

U.S. PATENT DOCUMENTS

2002/0080092 A1* 6/2002 Rantanen .............. G06F 3/1454
345/2.1
2004/0008249 A1* 1/2004 Nelson ................... H04N 7/152
348/14.09
(Continued)

FOREIGN PATENT DOCUMENTS

CN 1855831 A 11/2006
CN 101031065 A 9/2007
(Continued)

*Primary Examiner* — Melur Ramakrishnaiah
(74) *Attorney, Agent, or Firm* — Ling Wu; Stephen Yang; Ling and Yang Intellectual Property

(57) ABSTRACT

A video conference method, includes: during a conference, a first terminal operates a first application; performs first video processing on a video signal acquired by the first terminal and a video signal received from other terminals participating in the video conference, and displays the processed video signal; when the first terminal detects that one or more other applications on the first terminal are opened, the first terminal simultaneously operates the first application and other applications on the first terminal; and performs second video processing and third video processing on the video signal acquired by the first terminal, the video signal received from the other terminal participating in the video conference and an interface image(s) of the other applications on the first terminal, displays a video signal after the second video processing and transmits a video signal after the third video processing to the other terminal participating in the video conference.

6 Claims, 1 Drawing Sheet

(51) Int. Cl.
*H04L 12/18* (2006.01)
*H04L 29/06* (2006.01)
*H04M 3/56* (2006.01)

(52) U.S. Cl.
CPC ...... *H04L 65/4015* (2013.01); *H04L 65/4076* (2013.01); *H04L 65/604* (2013.01); *H04M 3/567* (2013.01); *H04N 7/15* (2013.01)

(58) Field of Classification Search
USPC .............................. 348/14.01–14.16; 709/204
See application file for complete search history.

(56) References Cited

U.S. PATENT DOCUMENTS

| | | |
|---|---|---|
| 2007/0039025 A1 | 2/2007 | Kraft et al. |
| 2010/0188473 A1 | 7/2010 | King et al. |
| 2011/0161836 A1* | 6/2011 | Mu ............... H04L 12/1813 715/756 |

FOREIGN PATENT DOCUMENTS

| | | |
|---|---|---|
| CN | 101365097 A | 2/2009 |
| CN | 101808220 A | 8/2010 |
| CN | 102215373 A | 10/2011 |
| CN | 102265613 A | 11/2011 |
| WO | 2011153623 A2 | 12/2011 |

\* cited by examiner

During a conference, a first terminal operates a first application, wherein operating the first application comprises: transmitting a video signal acquired by the first terminal to another terminal participating in the video conference, receiving a video signal from the other terminal; performing first video processing on the video signal acquired by the first terminal and the video signal received from the other terminal, and displaying the processed video signal ⟶ 100

When the first terminal detects that one or more other applications on the first terminal are opened, the first terminal simultaneously operates the first application and the one or more other applications on the first terminal; performs second video processing and third video processing on the video signal acquired by the first terminal, the video signal received from the other terminal and an interface image(s) of the one or more other applications on the first terminal; and displays the processed video signal or transmitting the processed video signal to the other terminal ⟶ 101

FIG. 1

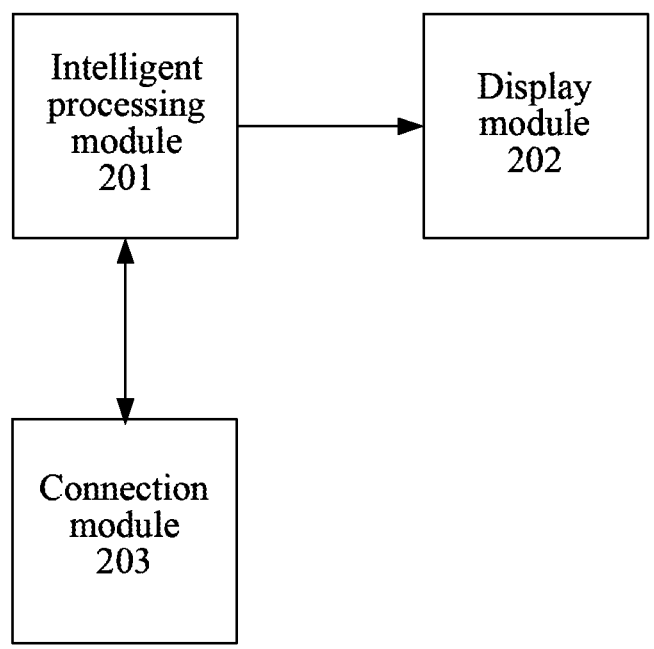

FIG. 2

VIDEO CONFERENCE METHOD, TERMINAL, AND SYSTEM

TECHNICAL FIELD

The present document relates to a multimedia technology, in particular to a video conference method, terminal and system based on an android platform.

BACKGROUND OF THE RELATED ART

Conference video terminals have already been widely applied in living and working. Through the conference video terminals, video conferences can be very conveniently hold in different scenarios simultaneously, and the working efficiency is greatly improved. However, a traditional conference video terminal can only view video signals transmitted by other video terminals during conferences, other applications (such as word documents and PPT) cannot be opened at the local terminal and be presented to other terminals, participators of the video conferences lack methods and tools for interaction therebetween, the function is usually comparatively single and the user experience is not good.

SUMMARY

The embodiments of the present document provide a video conference method, terminal and system based on an android platform, the effect that other applications can be presented to other terminals during a conference is realized and thus the user experience is improved.

The embodiment of the present document provides a video conference method, comprising:

during a conference, operating, by a first terminal, a first application, wherein operating a first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal; and when the first terminal detects that one or more other applications on the first terminal are opened, simultaneously operating, by the first terminal, the first application and the one or more other applications on the first terminal; and performing second video processing and third video processing on the video signal acquired by the first terminal, the video signal received from the other terminal participating in the video conference and an interface image(s) of the one or more other applications on the first terminal, displaying a video signal obtained after the second video processing, and transmitting a video signal obtained after the third video processing to the other terminal participating in the video conference.

Alternatively, in the method, a corresponding relation between switching instructions and video processing instructions is preset, and when the first terminal detects a switching instruction from a user, the method further comprises:

searching for a video processing instruction corresponding to the switching instruction according to the preset corresponding relation; and performing fourth video processing and fifth video processing on the video signal acquired by the first terminal, the video signal received from the other terminal participating in the video conference and the interface image(s) of the one or more other applications on the first terminal according to the searched video processing instruction; and displaying a video signal obtained after the fourth video processing and transmitting a video signal obtained after the fifth video processing to the other terminal.

The embodiment of the present document further provides a video conference terminal, comprising:

an intelligent processing module, configured to, during a conference, operate a first application, wherein operating a first application comprises: transmitting a video signal acquired by the video conference terminal to another terminal participating in the video conference and receiving a video signal from the other terminal participating in the video conference; perform first video processing on the video signal acquired by the video conference terminal and the video signal received from the other terminal participating in the video conference, transmit the processed video signal to a display module and transmit the video signal acquired by the video conference terminal to a connection module; and detect that one or more other applications on the video conference terminal are opened; simultaneously operate the first application and the one or more other applications on the video conference terminal; and perform second video processing and third video processing on the video signal of the first application, the video signal received from the other terminal participating in the video conference and an interface image(s) of the one or more other applications on the video conference terminal, transmit a video signal obtained after the second video processing to the display module and transmit a video signal obtained after the third video processing to the connection module;

the display module, configured to display the video signal received from the intelligent processing module; and the connection module, configured to transmit the video signal received from the intelligent processing module to the other terminal participating in the video conference; and transmit the video signal received from the other terminal participating in the video conference to the intelligent processing module.

Alternatively, the video conference terminal further comprises:

a storage module, configured to store a preset corresponding relation between switching instructions and video processing instructions;

the intelligent processing module is further configured to:

detect a switching instruction from a user, and search for a video processing instruction corresponding to the switching instruction according to the preset corresponding relation; and perform fourth video processing and fifth video processing on the video signal acquired by the video conference terminal, the video signal received from the other terminal participating in the video conference and the interface image(s) of the one or more other applications on the video conference terminal according to the searched video processing instruction, transmit a video signal obtained after the fourth video processing to the display module and transmit a video signal obtained after the fifth video processing to the connection module.

The embodiment of the present document further provides a video conference system, comprising two first terminals, wherein the first terminal is configured to:

during a conference, operate a first application, wherein operating a first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal; and when the first terminal detects that one or more other applications on the first terminal are opened, simultaneously operate the first application and the one or more other applications on the first terminal; and perform second video processing and third video processing on the video signal acquired by the first terminal, the video signal received from the other terminal participating in the video conference and an interface image(s) of the one or more other applications on the first terminal, display a video signal obtained after the second video processing and transmit a video signal obtained after the third video processing to the other terminal participating in the video conference.

Alternatively, the first terminal is further configured to:

store a preset corresponding relation between switching instructions and video processing instructions; detect a switching instruction from a user; search for a video processing instruction corresponding to the switching instruction according to the preset corresponding relation; and perform fourth video processing and fifth video processing on the video signal acquired by the first terminal, the video signal received from the other terminal participating in the video conference and the interface image(s) of the one or more other applications on the first terminal according to the searched video processing instruction; and display a video signal obtained after the fourth video processing and transmit a video signal obtained after the fifth video processing to the other terminal participating in the video conference.

The embodiments of the present document provide a video conference method, terminal and system based on an android platform, wherein the method comprises: during a conference, operating, by a first terminal, a first application, wherein operating a first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal; when the first terminal detects that one or more other applications on the first terminal are opened, simultaneously operating, by the first terminal, the first application and the one or more other applications on the first terminal; performing second video processing and third video processing on the video signal acquired by the first terminal, the video signal received from the other terminal participating in the video conference and an interface image(s) of the one or more other applications on the first terminal; and displaying a video signal obtained after the second video processing, and transmitting a video signal obtained after the third video processing to the other terminal participating in the video conference. In the embodiments of the present document, a terminal can present other applications simultaneously to other terminals during a conference, and thus the user experience is improved.

BRIEF DESCRIPTION OF DRAWINGS

The drawings in the embodiments of the present document will be described below. The drawings in the embodiments are used for understanding the present document, are used together with the description for explaining the present document, and do not form limitations on the protection range of the present document.

FIG. 1 is a flowchart of a video conference method based on an android platform provided by the embodiment of the present document;

FIG. 2 is a structural component diagram of a video conference terminal based on an android platform provided by the embodiment of the present document.

PREFERRED EMBODIMENTS

In order to facilitate the understanding of one skilled in the art, the present document will be correspondingly described below in combination with the drawings and the described embodiments shall not be used for limiting the protection range of the present document. It needs to be stated that the embodiments in the present application and the features in the embodiments can be freely combined with one another under the situation of no conflict.

Referring to FIG. 1, by taking an android platform as an example, the embodiment of the present document provides a video conference method, comprising:

In Step 100, during a conference, a first terminal operates a first application, wherein operating the first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal.

In this step, the first video processing refers to converting the video signal acquired by the first terminal and the video signal received from the other terminal participating in the video conference into video signals which are the same in size, then performing image splicing on the two video signals which are the same in size, converting the spliced video signal into a video signal which has the same size as a display, and then displaying the video signal on the display; or converting the video signal received from the other terminal participating in the video conference into a small window form to replace the video signal acquired by the first terminal and to be displayed on the display; or converting the video signal acquired by the first terminal into a small window form to replace the video signal received from the other terminal participating in the video conference and to be displayed on the display.

Sizes of the video signal acquired by the first terminal and the video signal received from the other terminal participating in the video conference are known, and an interpolation method, an averaging method or the like can be adopted in the size conversion process of the video signal. Any method is applicable as long as that the information of the video signal is not lost after conversion.

For example, superposition processing can be performed on the video signal acquired by the first terminal and the video signal received from the other terminal participating in the video conference, and then the superposed video signal is displayed, thus, with respect to displayed images, the video signal acquired by the first terminal is displayed in a large window form and the video signal received from the other terminal participating in the video conference is displayed in a small window form; vice versa; the video signal acquired by the first terminal and the video signal received from the other terminal participating in the video conference can also be displayed respectively on a portion of a screen; and any one signal thereof can also be solely displayed, etc.

In Step 101, when the first terminal detects that one or more other applications on the first terminal are opened, the first terminal simultaneously operates the first application and the one or more other applications on the first terminal; performs second video processing and third video processing on the video signal acquired by the first terminal, the video signal received from the other terminal participating in the video conference and an interface image(s) of the one or more other applications on the first terminal; and displays the video signal after the second video processing and transmitting the video signal after the third video processing to the other terminal participating in the video conference.

In this step, the one or more other applications can be word documents, text documents, PPT or video play, etc.

In this step, one application is defined as a process, and a split-screen technology is adopted for realizing the effect of simultaneously operating a plurality of processes on the foreground, i.e., one screen is divided into a plurality of areas. After division, different processes run in different areas, the entire complete interface information is stored in a frame buffer memory, and a system displays or transmits one of the processes to the other terminal.

In this step, ways for realizing the second video processing and the third video processing are similar to the way for realizing the first video processing, they are the display ways of different forms which are formed through combination based on different arrangement and combination and according to known image sizes. For example, superposition processing can be performed on the video signal acquired by the first terminal, the video signal received from the other terminal participating in the video conference and the interface image(s) of the one or more other applications on the first terminal, and then the superposed video signal is displayed, thus, with respect to displayed images, the video signal acquired by the first terminal, the video signal received from the other terminal participating in the video conference and the video signal of the one or more other applications on the first terminal can be displayed in any combined form; and any one signal thereof can also be solely displayed, etc.

In the video conference method, a corresponding relation between switching instructions and video processing instructions can be preset, and when the first terminal detects a switching instruction from a user, the method further comprises:

searching for a video processing instruction corresponding to the switching instruction according to the preset corresponding relation; performing fourth video processing and fifth video processing on the video signal acquired by the first terminal, the video signal received from the other terminal participating in the video conference and the interface image(s) of the one or more other applications on the first terminal according to the searched video processing instruction; and displaying the video signal after the fourth video processing and transmitting the video signal after the fifth video processing to the other terminal.

Therein, the principles of the fourth video processing and the fifth video processing are the same as the principle of the first video processing.

Through the method provided by the embodiment of the present document, the effect that one or more other applications can be simultaneously presented to other terminals during a conference is realized, and thus the user experience is improved.

An implementation process of the method will be described below through specific examples.

A user opens a first application to start a conference, what are displayed on a user interface at this moment are all users participating in the video conference, and a range occupied by each user on a screen is the same. For example, if the number of the users participating in the video conference is six, when the first application is opened, what are displayed on the screen are six same small windows, what is displayed in each window is a video signal acquired by the terminal of each user participating in the video conference, i.e., a head portrait of the user, and the video signal is transmitted to the other terminals participating in the video conference through real-time transmission. The user can switch the displayed content. For example, if a certain video conference participator gives a speech at this moment, the image can be switched to the image of the speaker, the switching process is the video signal processing process, and various switching modes can be preset in the video conference terminal.

When a video conference participator wants to open an application such as a word document recording an activity flow on the terminal thereof and transmit it to the other terminals during speaking, the speaker opens the word document at this moment and selects and transmits the word document to the other terminals, the word document can be displayed on the other terminals, the speaker can also simultaneously open a PPT document and transmit the PPT document to the other terminals, what is displayed on the other terminals at this moment is the PPT document, and the speaker can switch to simultaneously transmit the word document or the PPT document to the other terminals, but the other terminals cannot switch to view the word document or the PPT document and can only amplify and display the document transmitted by the speaker or switch to view other video conference participators.

In the process that each video conference participator switches the displayed contents, the contents displayed on the terminals corresponding to other video conference participators are not influenced and the running of the word document or the PPT document is not interrupted.

Referring to FIG. 2, based on an android platform, the embodiment of the present document further provides a video conference terminal, at least comprising:

an intelligent processing module 201, configured to, during a conference, operate a first application, wherein operating the first application comprises: transmitting a video signal acquired by the video conference terminal to another terminal participating in the video conference and receiving a video signal from the other terminal participating in the video conference; perform first video processing on the video signal acquired by the video conference terminal and the video signal received from the other terminal participating in the video conference, transmit the processed video signal to a display module and transmit the video signal acquired by the video conference terminal to a connection module; and detect that one or more other applications on the video conference terminal are opened; simultaneously operate the first application and the one or more other applications on the video conference terminal; and perform second video processing and third video processing on the video signal of the first application, the video signal received from the other terminal participating in the video conference and the interface image(s) of the one or more other applications on the video conference terminal, transmit the video signal obtained after the second video processing to the display module and transmit the video signal obtained after the third video processing to the connection module;

the display module 202, configured to display the video signal received from the intelligent processing module, wherein the display module can be a touch display screen, can also be a non-touch display screen and can also be a television, etc.; and the connection module 203, configured to transmit the video signal received from the intelligent processing module to the other terminal participating in the video conference; and transmit the video signal received from the other terminal participating in the video conference to the intelligent processing module.

The connection module can communicate by a wired or wireless way.

The video conference terminal provided by the embodiment of the present document further comprises:

a storage module, configured to store a preset corresponding relation between switching instructions and video processing instructions; and the intelligent processing module 201 is further configured to:

detect a switching instruction from a user, and search for a video processing instruction corresponding to the switching instruction according to the preset corresponding relation; and perform fourth video processing and fifth video processing on the video signal acquired by the video conference terminal, the video signal received from the other terminal participating in the video conference and the interface image(s) of the one or more other applications on the video conference terminal according to the searched video processing instruction, transmit the video signal obtained after the fourth video processing to the display module and transmit the video signal obtained after the fifth video processing to the connection module.

Based on an android platform, the embodiment of the present document further provides a video conference system, at least comprising two first terminals, the first terminal is configured to:

during a conference, operate a first application, wherein operating a first application comprises: transmitting a video signal acquired by the first terminals to another terminal participating in the video conference and receiving a video signal from the other terminal participating in the video conference; performing first video processing on the video signal acquired by the first terminal and the video signal received from the other terminal participating in the video conference, and displaying the processed video signal; and when the first terminal detects that one or more other applications on the first terminal are opened, simultaneously operate the first application and the one or more other applications on the first terminal; and perform second video processing and third video processing on the video signal acquired by the first terminal, the video signal received from the other terminal participating in the video conference and the interface image(s) of the one or more other applications on the first terminal, display the video signal obtained after the second video processing and transmit the video signal obtained after the third video processing to the other terminal participating in the video conference.

In the video conference system provided by the embodiment of the present document, the first terminal is further configured to:

store a preset corresponding relation between switching instructions and video processing instructions; detect a switching instruction from a user; search for a video processing instruction corresponding to the switching instruction according to the preset corresponding relation; perform fourth video processing and fifth video processing on the video signal acquired by the first terminal, the video signal received from the other terminal participating in the video conference and the interface image(s) of the one or more other applications on the first terminal according to the searched video processing instruction; and display the video signal obtained after the fourth video processing and transmit the video signal obtained after the fifth video processing to the other terminal participating in the video conference.

The embodiments of the present document provide a video conference method, terminal and system, based on an android platform, the effect that one or more other applications can be presented to other terminals during a conference is realized and thus the user experience is improved.

One skilled in the art can understand that all or part of the steps in the above-mentioned method can be completed by relevant hardware instructed by a program, and the program can be stored in a computer readable storage medium such as a read only memory, a magnetic disk or a compact disk. Alternatively, all or part of the steps of the above-mentioned embodiments can also be implemented by using one or more integrated circuits. Correspondingly, each module/unit in the above-mentioned embodiments can be implemented by means of hardware, and can also be implemented by means of a software function module. The present application is not limited to combinations of hardware and software in any specific form.

It needs to be stated that the above-mentioned embodiments are just used for facilitating the understanding of one skilled in the art instead of limiting the protection range of the present document. Any replacements, improvements and the like made by one skilled in the art to the present document without departing from the invention concept of the present document shall also be included in the protection range of the present document.

INDUSTRIAL APPLICABILITY

The embodiments of the present document realize the effect that the terminal can simultaneously present one or more other applications to other terminals during a conference, and thus the user experience is improved.

What we claim is:

1. A video conference method, comprising:

during a conference, operating, by a first terminal, a first application, wherein operating a first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal; and when the first terminal detects that one or more other applications on the first terminal are opened, simultaneously operating, by the first terminal, the first application and the one or more other applications on the first terminal; and performing second video processing and third video processing on the video signal acquired by the first terminal, the video signal received from the other terminal participating in the video conference and an interface image(s) of the one or more other applications on the first terminal, displaying a video signal obtained after the second video processing, and transmitting a video signal obtained after the third video processing to the other terminal participating in the video conference.

2. The video conference method according to claim 1, wherein, in the method, a corresponding relation between switching instructions and video processing instructions is preset, and when the first terminal detects a switching instruction from a user, the method further comprises:

searching for a video processing instruction corresponding to the switching instruction according to the preset corresponding relation; and performing fourth video processing and fifth video processing on the video signal acquired by the first terminal, the video signal received from the other terminal participating in the video conference and the interface image(s) of the one or more other applications on the first terminal according to the searched video processing instruction; and displaying a video signal obtained after the fourth video processing and transmitting a video signal obtained after the fifth video processing to the other terminal.

3. A video conference terminal, comprising:

an intelligent processing module, configured to, during a conference, operate a first application, wherein operating a first application comprises: transmitting a video signal acquired by the video conference terminal to another terminal participating in the video conference and receiving a video signal from the other terminal participating in the video conference; perform first video processing on the video signal acquired by the video conference terminal and the video signal received from the other terminal participating in the video conference, transmit the processed video signal to a display module and transmit the video signal acquired by the video conference terminal to a connection module; and detect that one or more other applications on the video conference terminal are opened; simultaneously operate the first application and the one or more other applications on the video conference terminal; and perform second video processing and third video processing on the video signal of the first application, the video signal received from the other terminal participating in the video conference and an interface image(s) of the one or more other applications on the video conference terminal, transmit a video signal obtained after the second video processing to the display module and transmit a video signals obtained after the third video processing to the connection module;

the display module, configured to display the video signal received from the intelligent processing module; and the connection module, configured to transmit the video signal received from the intelligent processing module to the other terminal participating in the video conference; and transmit the video signal received from the other terminal participating in the video conference to the intelligent processing module.

4. The video conference terminal according to claim 3, further comprising:

a storage module, configured to store a preset corresponding relation between switching instructions and video processing instructions; and wherein the intelligent processing module is further configured to:

detect a switching instruction from a user, and search for a video processing instruction corresponding to the switching instruction according to the preset corresponding relation; and perform fourth video processing and fifth video processing on the video signal acquired by the video conference terminal, the video signal received from the other terminal participating in the video conference and the interface image(s) of the one or more other applications on the video conference terminal according to the searched video processing instruction, transmit a video signal obtained after the fourth video processing to the display module and transmit a video signal obtained after the fifth video processing to the connection module.

5. A video conference system, comprising two first terminals, wherein the first terminal is configured to:

during a conference, operate a first application, wherein operating a first application comprises: transmitting a video signal acquired by the first terminal to another terminal participating in the video conference and receiving a video signal from the other terminal participating in the video conference; performing first video processing on the video signal acquired by the first terminal and the video signal received from the other terminal participating in the video conference, and displaying the processed video signal; and when the first terminal detects that one or more other applications on the first terminal are opened, simultaneously operate the first application and the one or more other applications on the first terminal; and perform second video processing and third video processing on the video signal acquired by the first terminal, the video signal received from the other terminal participating in the video conference and an interface image(s) of the one or more other applications on the first terminal, display a video signal obtained after the second video processing and transmit a video signal obtained after the third video processing to the other terminal participating in the video conference.

6. The video conference system according to claim 5, wherein the first terminal is further configured to:

store a preset corresponding relation between switching instructions and video processing instructions; detect a switching instruction from a user; search for a video processing instruction corresponding to the switching instruction according to the preset corresponding relation; and perform fourth video processing and fifth video processing on the video signal acquired by the first terminal, the video signal received from the other terminal participating in the video conference and the interface image(s) of the one or more other applications on the first terminal according to the searched video processing instruction; and display a video signal obtained after the fourth video processing and transmit a video signal obtained after the fifth video processing to the other terminal participating in the video conference.

* * * * *